Sept. 1, 1931. J. R. THORP 1,821,589
FOOT PEDAL
Filed June 11, 1930

Inventor
J. R. Thorp
by W. H. Lieber
Attorney

Patented Sept. 1, 1931

1,821,589

UNITED STATES PATENT OFFICE

JOEL R. THORP, OF WEST ALLIS, WISCONSIN, ASSIGNOR TO THE FULTON COMPANY, OF WEST ALLIS, WISCONSIN, A CORPORATION OF WISCONSIN

FOOT PEDAL

Application filed June 11, 1930. Serial No. 460,349.

This invention relates generally to improvements in foot operated pedal structures, and relates more specifically to improvements in the construction and operation of pedal mechanisms for actuating reciprocable elements such as automobile engine accelerator rods or the like.

An object of the invention is to provide an improved foot pedal structure which is simple and compact in construction and efficient in operation. Another object of the invention is to provide an improved mounting for a foot operable pedal, whereby the pedal may be conveniently applied to or removed from its normal support. A further object of the invention is to provide a foot pedal structure the greater portion of which may be formed of sheet metal with the aid of punches and dies, and which may be manufactured and sold at relatively low cost. Still another object of the invention is to provide a foot pedal which may be readily applied as an accessory to the accelerator actuating button and rod of most standard automobiles, and which when thus applied will greatly facilitate actuation of the accelerator. These and other objects and advantages will appear from the following detailed description.

Some of the novel features of foot pedal construction, disclosed but not specifically claimed herein, form the subject of copending application Serial No. 401,431, filed October 22, 1929.

A clear conception of an embodiment of the present improvement, and of the mode of forming, assembling and of manipulating foot pedal structures in accordance therewith, may be had by referring to the drawings accompanying and forming a part of this specification, in which like reference characters designate the same or similar parts in the several views.

Figure 1:
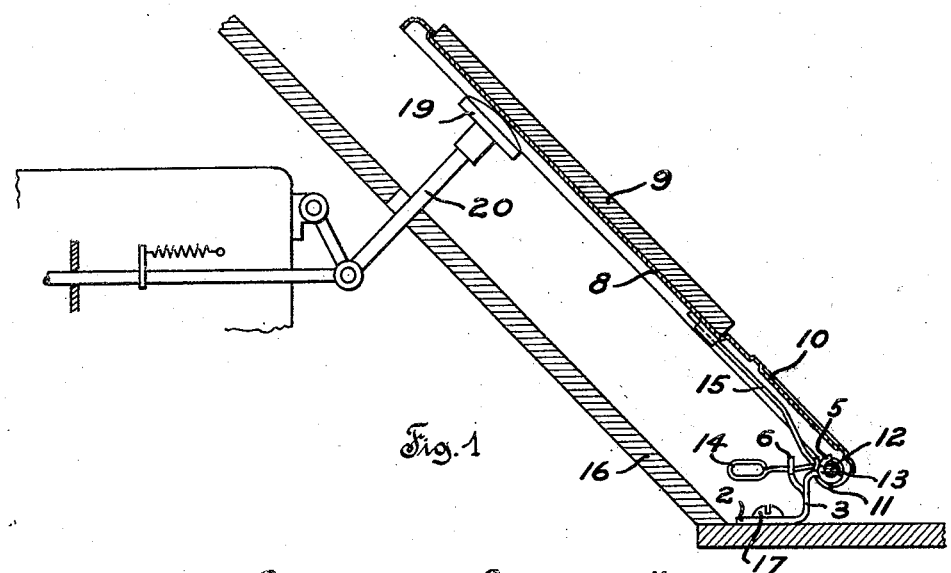
Fig. 1 is a vertical section through the pedal of one of the improved pedal structures, showing the same applied to the accelerator actuating rod of an automobile.
Figures 2, 3:
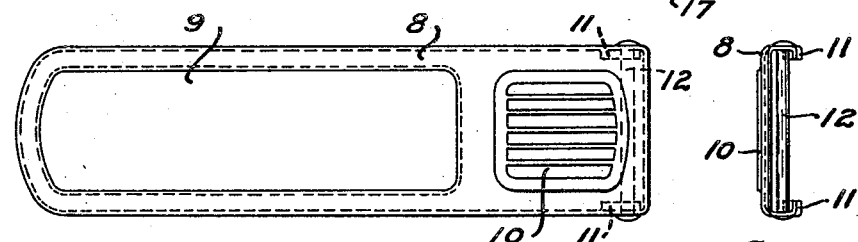
Fig. 2 is a top view of one of the improved sheet metal pedals.
Fig. 3 is a rear end view of the pedal.
Figure 4:
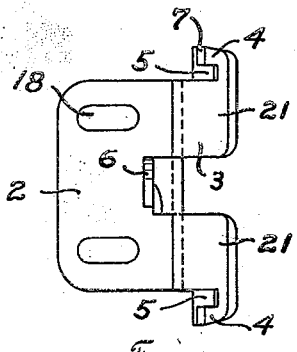
Fig. 4 is an enlarged top view of the improved sheet metal pedal supporting bracket.

The improved pedal mechanism specifically shown in the drawings by way of illustration, comprises in general a swingable sheet metal pedal 8 having side walls to the lower end portions of which a pivot pin 12 is rigidly attached; a sheet metal support or bracket 2 having longitudinally spaced rearwardly open recesses 4 adapted to receive the pivot pin 12 and also having a central hook 6 disposed between the recesses 4; and a coil spring 13 embracing the pivot pin 12 and having end portions 14, 15 cooperable with the hook 6 and pedal 8 respectively to resiliently restrain the pedal from moving upwardly. When the structure has been assembled and applied to the accelerator of an automobile, the bracket 2 is attached to the floor boards 16 by means of bolts or screws 17 passing through elongated holes 18 in the bracket, and the foot pedal 8 extends forwardly over the bracket 2 and coacts at its upper end with the button 19 at the upper end of the accelerator actuating rod 20. While the pedal device has been illustrated and described herein as being applied to an accelerator, it will be apparent that the improvement is more generally applicable to other reciprocable rod controls.

The foot pedal 8 may be stamped from a single plate of sheet metal with the aid of a punch and die, and has its upper portion depressed for the reception of a rubber pad 9. The lower portion of the pedal 8 may be provided with ridges 10 as shown, and the side walls of the pedal adjacent to the pivot pin 12, are provided with integral inwardly extending flanges or projections 11. The pivot pin 12 may be rigidly attached to the pedal side walls in any suitable manner as by riveting or welding.

The support or bracket 2 may likewise be formed of a single plate of sheet metal with the aid of punches and dies, and consists of a base portion within which the fastening holes 18 are formed, an upstanding wall 3 at the rear of the base portion, and an upper flange 21 projecting rearwardly from the top of the wall 3. The medial portions of the wall 3 and flange 21 are distorted and shaped to form the central hook 6, and the alined recesses 4 are formed in the upper flange 21. The ends of the flange 21 beyond the adjacent ends of the wall 3, are distorted to form semi-circular sockets 5, and beyond the outer end of each of the sockets 5 and adjoining the recesses 4, is a notched portion 7 forming a ledge extending sidewise beyond the bracket 2.

The retaining spring 13 is coiled around the pivot pin 12 before the pin is attached to the pedal 8, and has its longer end 15 secured directly to the underside of the pedal 8. The other end 14 of the spring 13 is looped and may be applied to the hook 6 of the bracket 2, as shown in Fig. 1, whereupon the spring will function to constantly urge the upper portion of the pedal 8 into engagement with the accelerator button 19. The accelerator rod 20 and button 19 are constantly urged toward uppermost position by means of a spring or the like, the tension of which is much greater than the tension of the relatively light spring 13 which merely serves to prevent rattling of the parts.

Figure 7:
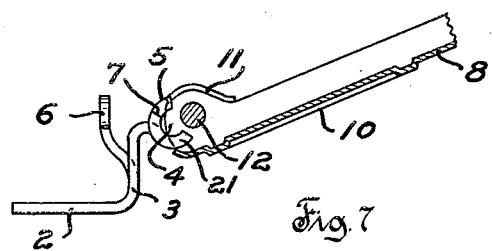
Fig. 7 is a side view of the supporting bracket showing a fragment of the pedal about to be applied thereto.
Figures 5, 6:
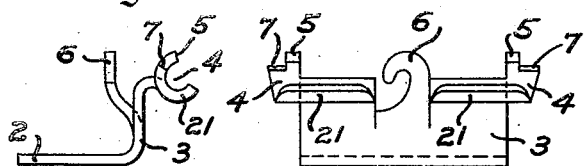
Fig. 5 is a similarly enlarged side view of the supporting bracket.
Fig. 6 is a likewise enlarged rear view of the supporting bracket.

When the support or bracket 2 has been attached to the floor board 16 as shown in Fig. 1, the pivot pin 12 of the pedal 8 can only be inserted into the recesses 4 at the upper rear portion of the bracket 2, by inverting the pedal and slipping the pin laterally into the rear open sides of the recesses 4 as illustrated in Fig. 7. During such insertion of the pin 12 within the recesses 4, the pedal projections 11 pass forwardly through the upper end notches of the bracket 2. After the pivot pin 12 has been properly positioned within the recesses 4, the pedal 8 may be swung forwardly over the bracket 2 and into engagement with the button 19 of the accelerator rod 20, whereupon the looped end 14 of the spring 13 may be inserted within the hook 6 to maintain the structure assembled. When the pedal 8 is properly mounted upon the bracket 2, the inwardly extending side projections 13 at the opposite sides of the pedal, coact with the undersides of the adjacent notched end portions 7 of the bracket 2, thereby preventing the pivot pin 12 from leaving the recesses 4. In order to remove the pedal 8 from the bracket 2, it is only necessary to first release the looped end 14 of the spring 13 from the hook 6, after which the pedal 8 may be swung rearwardly in line with the rear openings of the recesses 4 and subsequently freely withdrawn. It will thus be apparent that the pedal 8 may be quickly and conveniently applied to or removed from the fixed bracket 2, and that the pedal 8 practically conceals the supporting bracket 2 when the structure is assembled.

From the preceding description, it will be noted that the present invention provides a pedal structure which is extremely simple in construction and efficient in operation. The mechanism comprises only five parts, namely, the bracket 2, the pedal 8, the pivot pin 12, the spring 14, and the rubber pad 9. The pad 9 may however be dispensed with if desired, and the pin 12 and spring 13 are permanently attached to the pedal 8, thereby facilitating packing and shipment of the devices. By forming the bracket 2 and the pedal 8 of sheet metal, the cost of construction is reduced to a minimum while maintaining the desired rigidity.

The recessed formation of the bracket 2 and the interlocking projections of the pedal 8, provide simple and effective means for assembling the parts while providing a relatively long bearing for the pivot pin 12. The notched portions 7 of the bracket 2 moreover provide a compact construction, and the device may obviously be applied as an accessory to accelerator actuators of any standard automobile.

It should be understood that it is not desired to limit the present invention to the exact details of construction and operation herein shown and described, for various modifications within the scope of the appended claims may occur to persons skilled in the art.

It is claimed and desired to secure by Letters Patent:—

1. In combination, a fixed support having a rearwardly open recess, and a pedal having a transverse pivot pin insertible laterally into said recess when said pedal is inverted, said pedal being formed to interlock with said support adjacent to said recess to maintain said pin within said recess when said pedal is swung to normal position after insertion of said pin.

2. In combination, a fixed supporting bracket having a rearwardly open recess, and a pedal having a transverse pivot pin at one end thereof insertible laterally into said recess when said pedal is inverted, said pedal having a projection engageable with said bracket adjacent an end of said recess to maintain said pin within said recess when said pedal is swung to normal position after insertion of said pin.

3. In combination, a supporting bracket formed of sheet metal and having a rearwardly open recess pressed therein, and a sheet metal pedal having a transverse pivot pin attached thereto and insertible laterally into said recess when said pedal is inverted and directed rearwardly away from the open side of said recess, said pedal having a portion bent to interlock with said support adjacent to said recess to maintain said pin within said recess when said pedal is swung forwardly about said pin after insertion thereof within said recess.

4. In combination, a fixed support having a pair of longitudinally spaced alined rearwardly open recesses, and a pedal having a transverse pivot pin insertible laterally into said recesses when said pedal is inverted and rearwardly away from the open sides of said recesses, said pedal being formed to interlock with said support adjacent to both of said recesses to maintain said pivot pin within said recesses when said pedal is swung forwardly about said pin after insertion thereof within said recesses.

5. In combination, a fixed supporting bracket having a pair of longitudinally spaced alined rearwardly open recesses formed in an upper portion thereof, and a pedal having a transverse pin secured to an end thereof insertible laterally into said recesses when said pedal is inverted and directed rearwardly away from the open sides of said recesses, said pedal having a pair of projections engageable with said bracket adjacent to both of said recesses to maintain said pin within said recesses when said pedal is in normal operating position.

6. In combination, a bracket having rearwardly open recesses and a hook between said recesses, a pedal having a transverse pivot pin insertible laterally into said recesses when said pedal is tilted rearwardly of said bracket, said pedal being formed to lock said pin within said recesses when tilted forwardly, and means cooperating with said hook to restrain said pedal against upward movement.

7. In combination, a bracket having a rearwardly open recess and a notched portion adjacent to said recess, and a pedal having a transverse pivot pin insertible laterally into said recess when said pedal is directed rearwardly away from the open side of said recess, said pedal also having a projection movable through said notch during insertion of said pin into said recess and subsequently engageable with said notched portion to maintain the structure assembled during normal operation thereof.

8. In combination, a bracket having longitudinally spaced rearwardly open recesses and also having a notched portion adjoining each of said recesses, and a pedal having a transverse pin insertible laterally into said recesses when said pedal is directed rearwardly away from said recesses, said pedal also having projections movable through said notches during insertion of said pin into said recesses and engagable with said notched portions to maintain said bracket and pedal normally assembled.

9. In combination, a sheet metal bracket having a recess and a hook adjacent to said recess, a sheet metal pedal having a pivot pin insertible laterally into said recess from the rear of said bracket, said pedal having a side projection engageable with a lower surface of said bracket adjacent to said recess to lock said pin within said recess, and a spring cooperable with said hook to restrain said pedal against upward movement.

10. In combination, a one piece bracket having a recess and an integral hook adjacent to said recess, a pedal having a pivot pin rigidly attached thereto and insertible laterally into said recess from the rear of said bracket, said pedal having an integral side projection engageable with a lower surface of said bracket to lock said pin within said recess, and a spring carried by said pin and cooperable with said hook to restrain said pedal against upward swinging movement.

11. In combination, a one-piece sheet metal bracket having rearwardly open recesses and a hook between said recesses, a sheet metal pedal having a pivot pin insertible laterally into said recesses from the rear of said bracket, said pedal having side projections engageable with lower surfaces of said bracket to lock said pin within said recesses, and a spring cooperable with said hook to restrain said pedal against upward swinging movement.

12. In combination, a bracket having a pair of spaced recesses and an integral hook disposed between said recesses, a pedal having a pivot pin insertible laterally into said recesses from the rear of said bracket, said pedal having integral inwardly extending side projections engageable with lower side surfaces of said bracket to lock said pin within said recesses, and a spring cooperable with said hook to urge said pedal toward said bracket.

13. In combination, a bracket comprising a base and a rear flange provided with rearwardly open recesses, and a pedal having a pivot pin insertible laterally into said recesses from the rear of said bracket, said pedal having side projections engageable with side surfaces of said bracket to lock said pin within said recesses and concealing said bracket when the structure is assembled.

14. In combination, a bracket comprising a base and a rear portion provided with a rearwardly open recess, and a pedal having a pivot pin insertible laterally into said recess from the rear of said bracket, said pedal extending forwardly over said bracket and being formed to lock said pin within said recess when said pedal is thus disposed.

In testimony whereof, the signature of the inventor is affixed hereto.

JOEL R. THORP.